United States Patent
Touati et al.

(10) Patent No.: US 9,578,647 B2
(45) Date of Patent: Feb. 21, 2017

(54) 3GPP BEARER-BASED QOS MODEL SUPPORT ON WIFI

(71) Applicant: TELEFONAKTIEBOLAGET L M ERICSSON (PUBL), Stockholm (SE)

(72) Inventors: Samy Touati, San Jose, CA (US); Dinand Roeland, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/013,812

(22) Filed: Aug. 29, 2013

(65) Prior Publication Data

US 2015/0063101 A1   Mar. 5, 2015

(51) Int. Cl.
*H04W 72/08* (2009.01)
*H04W 28/02* (2009.01)
*H04W 76/02* (2009.01)

(52) U.S. Cl.
CPC ....... *H04W 72/087* (2013.01); *H04W 28/0268* (2013.01); *H04W 76/022* (2013.01); *H04W 76/027* (2013.01)

(58) Field of Classification Search
USPC ........................................................ 370/230
See application file for complete search history.

(56) References Cited

U.S. PATENT DOCUMENTS

| 2005/0210154 | A1  | 9/2005 | Verma et al. | |
|---|---|---|---|---|
| 2006/0072526 | A1* | 4/2006 | Rasanen | 370/338 |
| 2006/0083193 | A1* | 4/2006 | Womack et al. | 370/328 |
| 2008/0205345 | A1* | 8/2008 | Sachs et al. | 370/332 |
| 2009/0016344 | A1* | 1/2009 | Hu et al. | 370/389 |
| 2010/0202351 | A1* | 8/2010 | Xi | H04L 29/12188 370/328 |
| 2012/0020215 | A1  | 1/2012 | Lai | |

(Continued)

FOREIGN PATENT DOCUMENTS

CN   1 863 145 A   11/2006
EP   1 843 530 A2  10/2007

(Continued)

OTHER PUBLICATIONS

Nichols et al. "Definition of the Differentiated Services Field (DS Field) in the IPv4 and IPv6 Headers" RFC 2474, Dec. 1998.*

(Continued)

*Primary Examiner* — Robert M Morlan

(57) ABSTRACT

A method is disclosed for providing broadband access to a Packet Data Network (PDN) from a WLAN. A network node receives a request for a dedicated bearer from a PDN gateway, along with one or more Quality of Service (QoS) requirements. Responsive to the bearer request, the network node sends a request to an access point in the WLAN for load information indicative of a load of the access point, and receives the requested load information. Based on the load information, the network node determines whether the access point would be able to meet the one or more QoS requirements if the bearer request was granted. If the determining indicates that the access point would be able to meet the one or more QoS requirements, the network node creates the dedicated bearer between the wireless terminal and the PDN gateway according to the one or more QoS requirements.

6 Claims, 13 Drawing Sheets

(56) References Cited

U.S. PATENT DOCUMENTS

| | | | | |
|---|---|---|---|---|
| 2012/0324100 | A1* | 12/2012 | Tomici | H04L 45/123 709/224 |
| 2013/0029588 | A1* | 1/2013 | Bienas et al. | 455/7 |
| 2013/0088983 | A1* | 4/2013 | Pragada et al. | 370/252 |
| 2013/0121145 | A1* | 5/2013 | Draznin et al. | 370/230 |
| 2013/0155965 | A1* | 6/2013 | Koodli | 370/329 |
| 2014/0082697 | A1* | 3/2014 | Watfa et al. | 726/3 |
| 2014/0341182 | A1* | 11/2014 | Gage et al. | 370/331 |
| 2015/0003435 | A1* | 1/2015 | Horn et al. | 370/338 |
| 2015/0124601 | A1* | 5/2015 | Li et al. | 370/230 |

FOREIGN PATENT DOCUMENTS

| | | |
|---|---|---|
| EP | 2 007 083 A2 | 12/2008 |
| EP | 2 688 363 A2 | 1/2014 |
| WO | WO 2006/000612 A1 | 1/2006 |
| WO | WO 2006/122487 A1 | 11/2006 |
| WO | WO 2006/137705 A1 | 12/2006 |
| WO | WO 2011/157129 A2 | 12/2011 |
| WO | WO 2011/157152 A2 | 12/2011 |

OTHER PUBLICATIONS

Encarta, "definition of Node" Jun. 4, 2011.*
PC Magazine Encyclopedia "definition of node" May 10, 2013.*
3GPP TS 23.401, V12.0.0 (Mar. 2013), $3^{rd}$ Generation Partnership Project; Technical Specification Group Services and System Aspects; General Packet Radio Service (GPRS) enhancements for Evolved Universal Terrestrial Radio Access Network (E-UTRAN) access, Mar. 7, 2013, Release 12, the whole document.
3GPP TS 23.203, V12.0.0 (Mar. 2013), $3^{rd}$ Generation Partnership Project; Technical Specification Group Services and System Aspects; Policy and charging control architecture, Mar. 7, 2013, Release 12, the whole document.
3GPP TS 29.212, V12.0.0 (Mar. 2013), $3^{rd}$ Generation Partnership Project; Technical Specification Group Core Network and Terminals; Policy and Charging Control (PCC); Reference Points, Mar. 15, 2013, the whole document.
3GPP TS 23.139 v11.4.0 (Mar. 2013), $3^{rd}$ Generation Partnership Project; Technical Specification Group Services and System Aspects: 3GPP System—fixed broadband access network interworking, Stage 2, Release 11, Mar. 7, 2013, the whole document.
IEEE 802.11 Wireless LAN Medium Access Control (MAC) and Physical Layer (PHY) Specifications, IEEE Computer Society, Mar. 29, 2012, the whole document.
Lundstrom, A. et al., "Wi-Fi integration", Ericsson Review, Feb. 2011, the whole document.
3GPP TS 23.234 V11.0.0 (Sep. 2012), 3rd Generation Partnership Project; Technical Specification Group Services and System Aspects; 3GPP system to Wireless Local Area Network (WLAN) interworking; System description (Release 11), 650, Route Des Lucioles; F-06921 Sophia-Antipolis Cedex; France, vol. SA WG2, Sep. 17, 2012 (Sep. 17, 2012), pp. 1-84, XP050649114.
"E-UTRAN—eHRPD Connectivity and Interworking: Core Network Aspects", 3GPP2 Draft; X.S0057-B, 3rd Generation Partnership Project 2, 3GPP2, 2500 Wilson Boulevard, Suite 300, Arlington, Virginia 22201; USA , vol. TSGX, No. Version 0.2, Oct. 11, 2011 (Oct. 11, 2011), pp. 1-276, XP062104590, Retrieved from the Internet: URL:http://ftp.3gpp2.org/TSGX/Projects/X.P 0057 LTE-eHRPD Interworking—Network Aspects/Revision B v1.0/Working Drafts/, [retrieved on Oct. 11, 2011], paragraph [5 .5.3.1].

* cited by examiner

| WMM AC MAPPING | DSCP MAPPING | 3GPP QCI | EXAMPLES SERVICES |
|---|---|---|---|
| AC_VO 3 | 46 (EF) | 1 | Conversational voice |
| AC_VO 3 | 46 (EF) | 2 | Conversational video (Live streaming) |
| AC_VO 3 | 46 (EF) | 3 | Real time gaming |
| AC_VI 2 | 34 (AF 41) | 4 | Non-conversational video (Buffered streaming) |
| AC_VI 2 | 26 (AF 31) | 5 | IMS signaling |
| AC_VI 2 | 26 (AF 31) | 6 | TCP based services, video |
| AC_BE 0 | 18 (AF 21) | 7 | Interactive gaming |
| AC_BE 0 | 10 (AF 10) | 8 | Web, email |
| AC_BK 1 | 0 (BE) | 9 | Email |

*FIG. 7*

3GPP BEARER-BASED QOS MODEL SUPPORT ON WIFI

TECHNICAL FIELD

The present disclosure relates to broadband access networks, and more particularly to dedicated bearers in a broadband access network.

BACKGROUND

Traditionally, users of Wi-Fi enabled devices have relied on Wi-Fi networks in their home and perhaps their office to gain broadband Internet access. So-called Wi-Fi hotspots in public areas like airports and restaurants have also become quite common. In such networks, an Internet Service Provider (ISP) generally provides a wired Internet connection, and at the point of use a wireless router is set up to provide Wi-Fi access.

In contrast with ISPs, wireless network operators use radio access networks (RANs) to provide access to a core network, with the core network providing connectivity to external packet data networks (e.g., the Internet). However, given the increasing popularity of mobile broadband, wireless network operators are becoming increasingly interested in providing their own Wi-Fi access, through their own distributed wireless access points in a RAN, or through broadband access networks. This could facilitate users relying on a network operator for both their mobile Internet access and also fixed Internet access for generally stationary devices (e.g., home computers, media centers, etc.).

FIG. 1 illustrates a high level example of such an arrangement, in which a wireless terminal 12 is able to access a packet data network 14 (e.g., the Internet) through either a "mobile network" 16 or a "fixed network" 18. The mobile network 16 includes one or more radio base stations, while the fixed network 18 (the so-called "wireline domain") includes a broadband access network. A Packet Data Network Gateway (PDN-GW) 20 within core network 22 connects the mobile network 16 and fixed network 18 to the packet data network 14. As shown in FIG. 1, wireless terminal 12a is able to transition between the mobile and fixed networks 16, 18. This is sometimes known as "carrier grade Wi-Fi."

Third Generation Partnership Project (3GPP) mobile networks have a bearer-based mechanism for supporting Quality of Service (QoS) that is defined between a wireless terminal 12 (also known as a user equipment "UE" in some networks) and the PDN-GW 20. A dedicated bearer refers to a tunnel that carries flows sharing the same QoS characteristics. In 3GPP networks, the PDN-GW 20 maintains the downlink bearer mappings, while a UE maintains the uplink bearer mappings. These are used to map the different flows to the appropriate dedicated bearer based on 5 tuples (e.g., source IP address, source port, destination IP address, destination port, and a content identifier). The bearer mappings are created once a dedicated bearer establishment procedure is completed successfully.

As network operators begin to offer both mobile and fixed networks 16, 18, it is desirable to maintain the same QoS over both networks 16, 18. According to current 3GPP procedures, a procedure called "reflective QoS" is used in which downlink QoS is mirrored in the uplink (see, e.g., 3GPP TS 23.139). That is, an n-tuple uplink rule is created by inversing the source and destination addresses (and ports numbers) of the downlink packets and associating with a Differentiated Services Code Point (DSCP) marking contained in the downlink packet, such that the same DSCP marking is used in both the uplink and downlink directions. When an uplink packet is to be sent from a UE to the network over Wi-Fi (e.g., over the fixed network 18), a corresponding uplink n-tuple rule is looked up, and if found, the uplink frame is marked with the appropriate DSCP marking. Reflective QoS ensures that uplink frames are marked in the same way as their corresponding downlink frames.

SUMMARY

According to one aspect of the present disclosure, a method is disclosed which is implemented by a network node in a broadband access network or a wireless local area network (WLAN) to provide broadband access to a packet data network (PDN) from the WLAN via a PDN gateway. In particular, the broadband access is provided for a wireless terminal in the WLAN. A bearer request is received from the PDN gateway that includes one or more Quality of Service (QoS) requirements, and that requests creation of a dedicated bearer. Responsive to receiving the bearer request, a request is sent to an access point in the WLAN for load information indicative of a load of the access point. The requested load information is received from the access point. The network node determines, based on the load information, whether the access point would be able to meet the one or more QoS requirements if the bearer request was granted. If the determining indicates that the access point would be able to meet the one or more QoS requirements, the network node creates the dedicated bearer between the wireless terminal and the PDN gateway according to the one or more QoS requirements.

According to another aspect of the present disclosure, a complementary network node is disclosed which is configured for use in a broadband access network or WLAN, to provide broadband access to a PDN from the WLAN via a PDN gateway. The broadband access is provided for a wireless terminal in the WLAN. The network node comprises one or more processing circuits configured to: receive a bearer request from the PDN gateway that includes one or more QoS requirements, and that requests creation of a dedicated bearer. The one or more processing circuits are further configured to, responsive to receipt of the bearer request, send a request to an access point in the WLAN for load information indicative of a load of the access point. The one or more processing circuits are further configured to receive the requested load information from the access point, and based on that load information determine whether the access point would be able to meet the one or more QoS requirements if the bearer request was granted. If the determining indicates that the access point would be able to meet the one or more requirements, the one or more processing circuits are configured to create the dedicated bearer between the wireless terminal and the PDN gateway according to the one or more QoS requirements.

According to another aspect of the present disclosure, a method is disclosed which is implemented by an access point in a WLAN that is operative to connect a wireless terminal in the WLAN to a PDN through a broadband access network. The access point receives a request from a network node in the broadband access network for load information indicative of a load of the access point, and transmits the requested load information to the network node. The access point subsequently receives, based on the transmitted load information, a bearer identifier (ID) and a Differentiated Services Code Point (DSCP) indicator for a dedicated bearer. The access point receives uplink traffic from the wireless terminal that includes the DSCP indicator and the bearer ID, and transmits the received uplink traffic to the PDN using the dedicated bearer.

According to another aspect of the present disclosure, a complementary access point is disclosed which is configured for use in a WLAN, to connect a wireless terminal in the WLAN to a PDN through a broadband access network. The access point comprises one or more processing circuits configured to receive a request from a network node for load information indicative of a load of the access point, and transmit the requested load information to the network node. The one or more processing circuits are further configured to subsequently receive, based on the transmitted load information, a bearer identifier (ID) and a Differentiated Services Code Point (DSCP) indicator for a dedicated bearer. The one or more processing circuits are further configured to receive uplink traffic from the wireless terminal that includes the DSCP indicator and the bearer ID, and transmit the received uplink traffic to the packet data network using the dedicated bearer.

According to another aspect of the present disclosure, a method is disclosed which is implemented by a wireless terminal operative to communicate with a PDN through a WLAN that connects to the packet data network via a broadband access network and a core network. The wireless terminal transmits a request to a policy controller in the core network for a new service. Based on the request for a new service, the wireless terminal receives a bearer request to create a dedicated bearer for the new service, the bearer request including one or more Traffic Flow Templates (TFTs) for the bearer. Thereafter, if uplink traffic from the wireless terminal matches any of the one or more TFTs, the wireless terminal uses the dedicated bearer to transmit the uplink traffic to the packet data network through the WLAN, the broadband access network, and the core network.

According to another aspect of the present disclosure, a complementary wireless terminal is disclosed that is configured to communicate with a PDN through a wireless local area network (WLAN) that connects to the packet data network via a broadband access network and a core network, the wireless terminal comprising one or more processing circuits configured to transmit a request to a policy controller in the core network for a new service, and based on the request for a new service, receive a bearer request to create a dedicated bearer for the new service, the bearer request including one or more Traffic Flow Templates (TFTs) for the bearer. Thereafter, the one or more processing circuits are further configured to, if uplink traffic from the wireless terminal matches any of the one or more TFTs, use the dedicated bearer to transmit the uplink traffic to the packet data network through the WLAN, the broadband access network, and the core network.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 7 illustrates an example mapping QCI/DSCP mapping.

DETAILED DESCRIPTION

According to one or more embodiments discussed below, creation of a dedicated uplink bearer is disclosed to enable a wireless terminal to use QoS defined for uplink traffic instead of simply reusing downlink QoS information through reflective QoS. Additionally, an admission control procedure is introduced to prevent creation of such a dedicated bearer if an access point would be unable to support the QoS requirements of the dedicated bearer.

Figure 1:
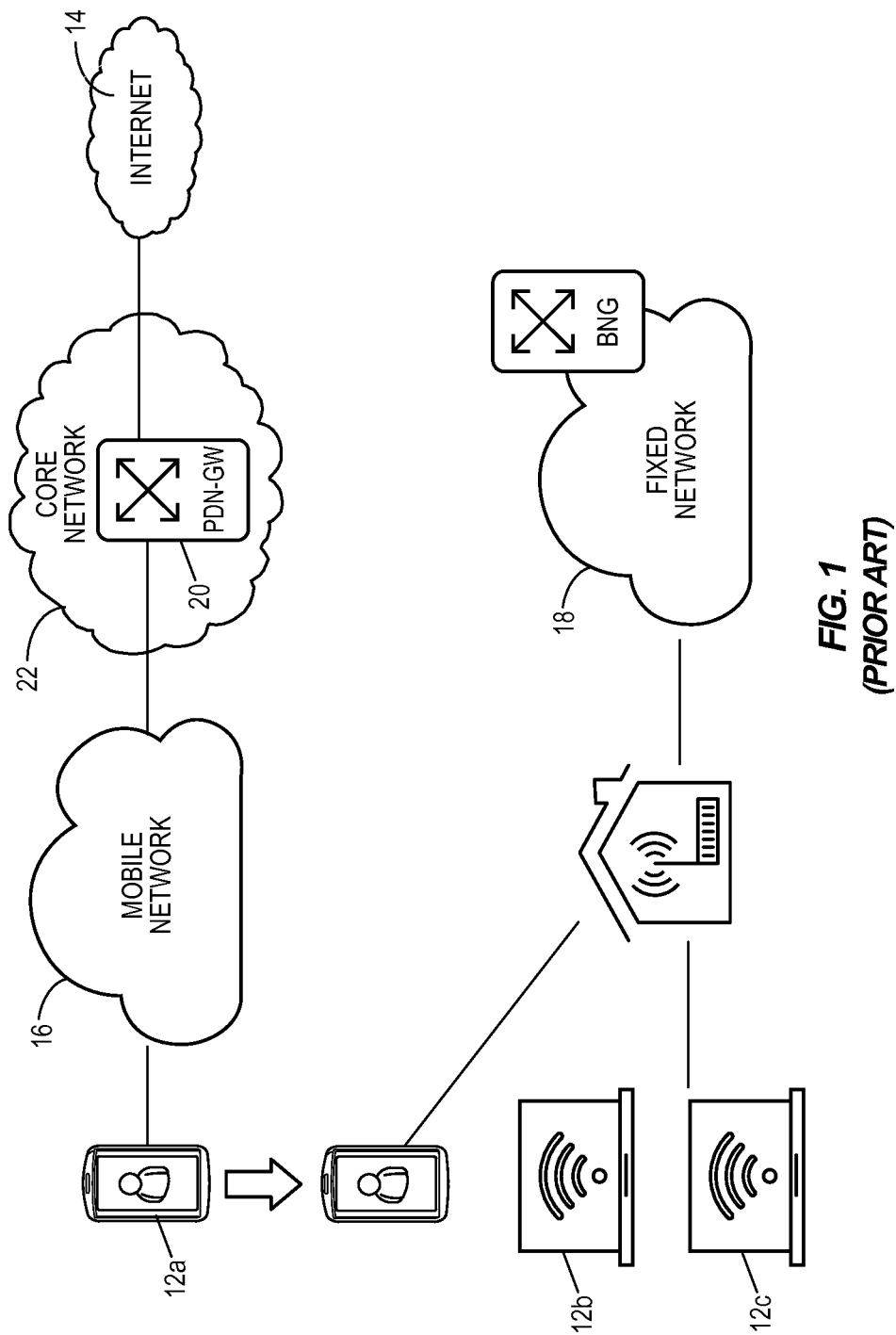
FIG. 1 is a block diagram of one embodiment of a core network providing access to a packet data network through either a mobile network or a fixed network.
Figure 2:
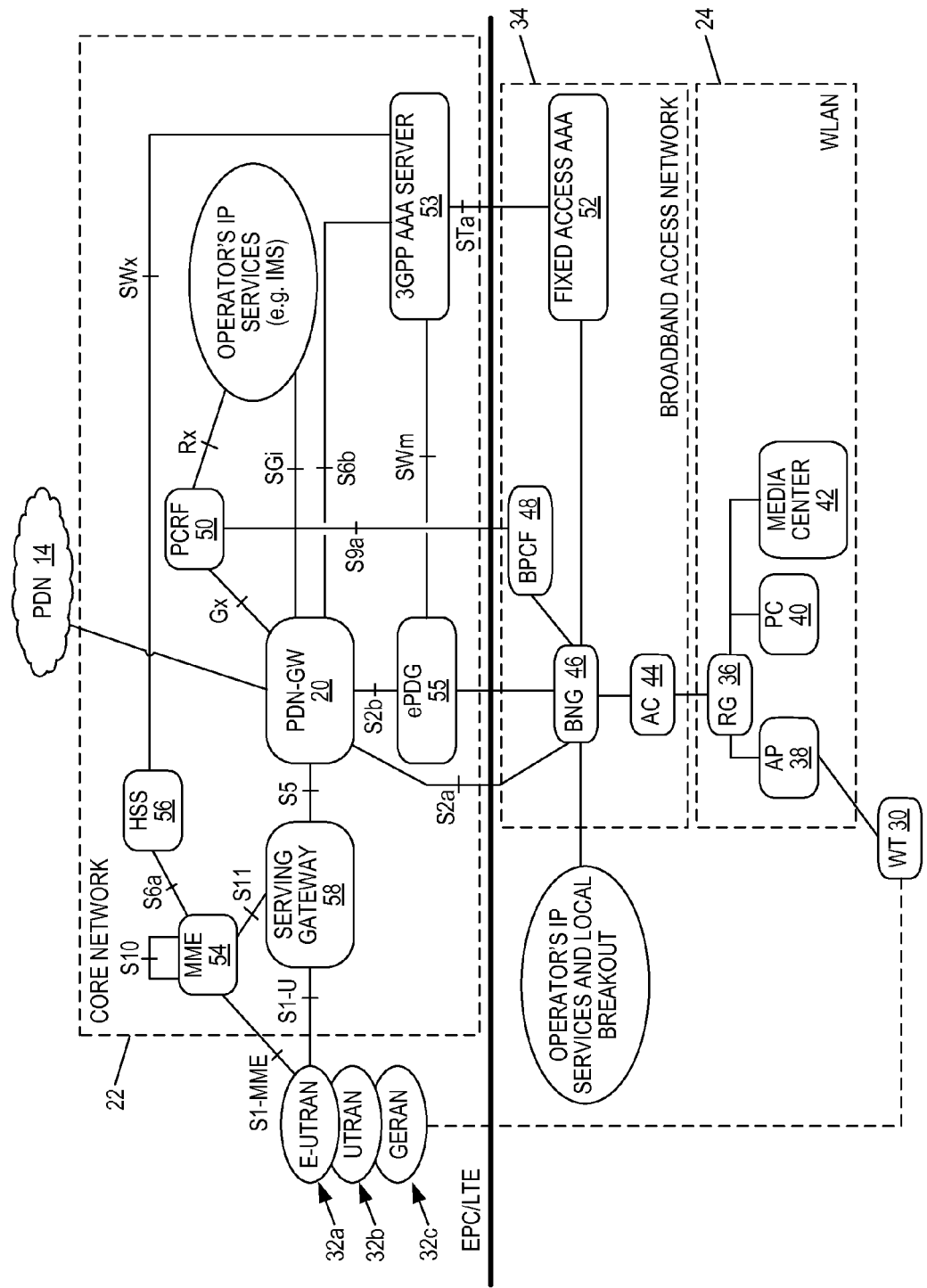
FIG. 2 illustrates an architecture for providing broadband access to a packet data network from a wireless local area network (WLAN).

FIG. 2 illustrates an architecture for providing broadband access to a packet data network (PDN) 14 (e.g., the Internet) from a wireless local area network (WLAN), with the broadband access being provided for a wireless terminal 30 in the WLAN 24. The wireless terminal 30 may be a cellular telephone, smartphone, personal digital assistant (PDA), user equipment (UE), tablet computer, laptop computer, laptop embedded equipment (LEE), laptop mounted equipment (LME), USB dongle, or any other device equipped with wireless communication capabilities. The WLAN 24 may cover a residential location, a commercial location (e.g., a Wi-Fi hotspot for an office), or a municipal location such as a transportation hub, for example.

The wireless terminal 30 is operative to access PDN 14 through either a radio access network 32a-c, or through broadband access network 34. The WLAN includes a residential gateway 36 (e.g., a modem), and a wireless access point (AP) 38 (e.g., a Wi-Fi AP supporting one or more of the 802.11 standards). Additional devices may connect directly to the residential gateway 36, such as a PC 40 and/or media center 42. A residential gateway 36 connects the AP 38 to broadband access network 34 via an access controller 44. Although illustrated as residing in the broadband access network 34, it is understood that in some embodiments the residential gateway 36 could instead reside in the WLAN 24. In one or more embodiments, the access controller 44 also serves as a "Generic Access Controller" that routes Voice over Internet Protocol (VoIP) traffic to the core network 22.

A border network gateway (BNG) 46 connects the broadband access network 34 to a core network 22. In one or more embodiments the core network 22 comprises an Evolved Packet Core (EPC) of a 3GPP Long Term Evolution (LTE) network. A broadband policy control function (BPCF) interacts with a policy charging and rules function (PCRF) 50 in the core network 22, and extends policy control features of the PCRF 50 into the broadband access network 34. In a similar fashion, a fixed access Authentication, Authorization, and Accounting (AAA) controller 52 extends functionality of a 3GPP AAA server 53 in the core network 22 to the broadband access network 34.

In the core network 22, PDN-GW 20 provides connectivity to the external PDN 14, and performs policy enforcement, packet filtering, and other functions. The Evolved Packet Data Gateway (ePDG) 55 resides between the BNG 46 and the PDN gateway 20 and may optionally be used if the broadband access network 34 is considered to be untrusted. MME 54 processes signaling between the RAN 32 and the core network 22, and interacts with Home Subscriber Server (HSS) 56 to authenticate users. A Serving Gateway (GW) 58 routes and forwards user data packets from the RAN 32.

Figure 3:
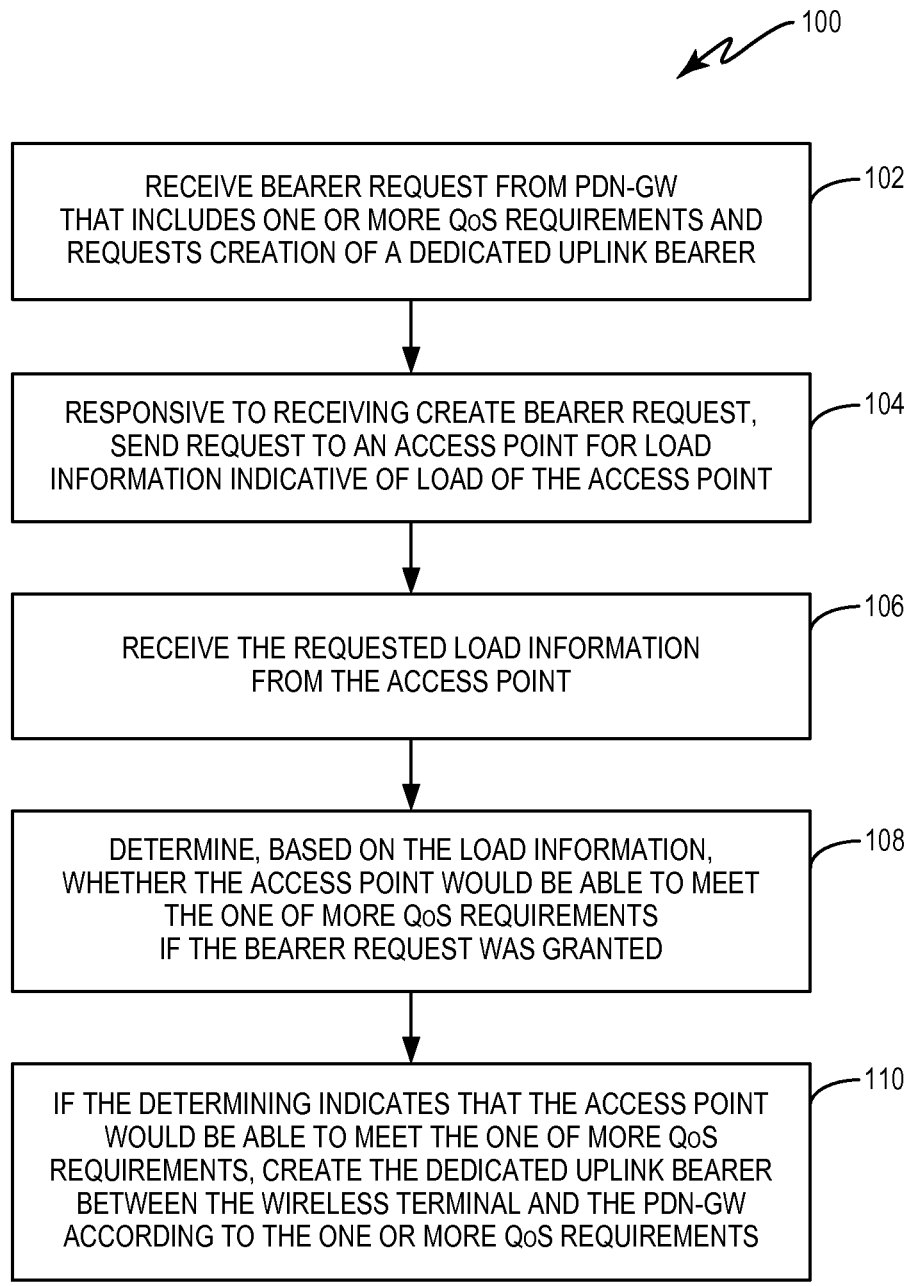
FIG. 3 is a flow diagram of a method that provides broadband access to a packet data network from a WLAN.

FIG. 3 illustrates a method 100 implemented by a network node in the broadband access network 34 or the WLAN 24, to provide broadband access to PDN 14 from the WLAN 24. The broadband access is provided for the wireless terminal 30 in the WLAN 24. For the discussion below, the access controller (AC) 44 will be described as performing the method 100. A bearer request is received (block 102) from the PDN-GW 20 that includes one or more Quality of Service (QoS) requirements (e.g., a QoS Class Identifier "CQI"), and that requests creation of a dedicated bearer. Responsive to receiving the bearer request, the AC 44 sends (block 104) a request to AP 38 in the WLAN 24 for load information indicative of a load of the AP 38. The requested load information is received (block 106) from the AP 38. Based on the load information, the AC 44 determines (block 108) whether the AP 38 would be able to meet the one or more QoS requirements if the bearer request was granted. If the AC 44 determines that the AP 38 would be able to meet the one or more QoS requirements, the AC 44 creates (block 110) the dedicated bearer between the wireless terminal 30 and the PDN-GW 20 according to the one or more QoS requirements.

Blocks 108-110 introduce admission control in the WLAN 24 that takes into account the load of the AP 38. This ensures that a dedicated bearer can carry the flows based on the requested QCI, without impacting the 802.11 Wi-Fi multimedia (WMM) support. In one or more embodiments, the load information of the AP 38 includes a congestion level of the AP 38 (e.g., a QoS Basic Service Set "QBSS" load), a number of wireless terminals connected to the AP 38, a total throughput being forwarded through the AP 38, as well as any existing dedicated bearers currently supported by the AP 38. This Admission Control mechanism allow the AC to indicate whether the dedicated bearer creation can take place, or whether a different QCI must be used. In one or more embodiments, the admission control of blocks 108-110 takes place every time the wireless terminal 30 moves between access points, and if a given access point cannot accommodate a dedicated bearer, traffic that would otherwise have been handled with that dedicated bearer can be reclassified as "best effort."

In one or more embodiments, if the determining of blocks 108-110 indicates that the AP 38 would not be able to meet the one or more QoS requirements, the AC 44 performs one or more of: transmitting a response to a policy controller (e.g., PCRF 50) in the core network 22 to reject the bearer request, suggesting one or more alternate QoS requirements to the policy controller, and steering the wireless terminal 30 to a different, second AP (not shown). In one or more embodiments, steering the wireless terminal 30 to the second AP includes: sending a request to the second AP for load information indicative of a load of the second AP; receiving the requested load information from the second AP; determining based on the load information, whether the second AP would be able to meet the one or more QoS requirements if the bearer request was granted; and if the determining indicates that the second AP would be able to meet the one or more QoS requirements, steering the wireless terminal 30 to the second AP.

Figure 4:
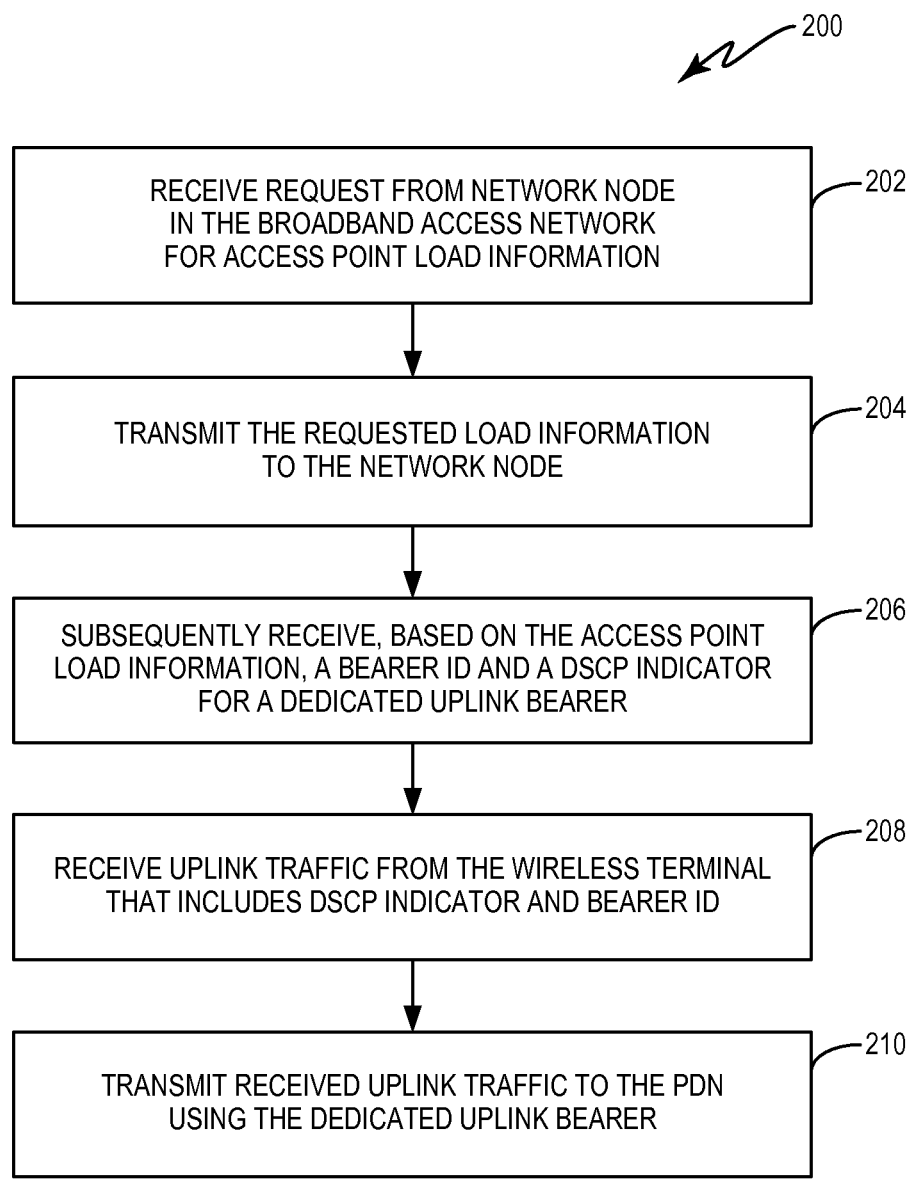
FIG. 4 is a flow diagram of a complementary method performed by an access point.

FIG. 4 is a flow diagram of a complementary method 200 performed by the AP 38 in the WLAN 24, with the WLAN 24 being operative to connect the wireless terminal 30 in the WLAN 24 to the PDN 14 through broadband access network 34. The AP 38 receives (block 202) a request from a network node in the broadband access network 34 (e.g., AC 44) for load information indicative of a load of the AP 38. Based on this request, the AP 38 transmits (block 204) the requested load information to the network node. Subsequently the AP 38 receives (block 206), based on the transmitted load information, a bearer identifier (ID) and a Differentiated Services Code Point (DSCP) indicator for a dedicated bearer from the network node. The AP 38 receives (block 208) uplink traffic from the wireless terminal 30 that includes the DSCP indicator and the bearer ID, and transmits (block 210) the received uplink traffic to the PDN 14 using the dedicated bearer. Example DSCP indicators are provided in FIG. 7, which is discussed in more detail below.

Figure 5:
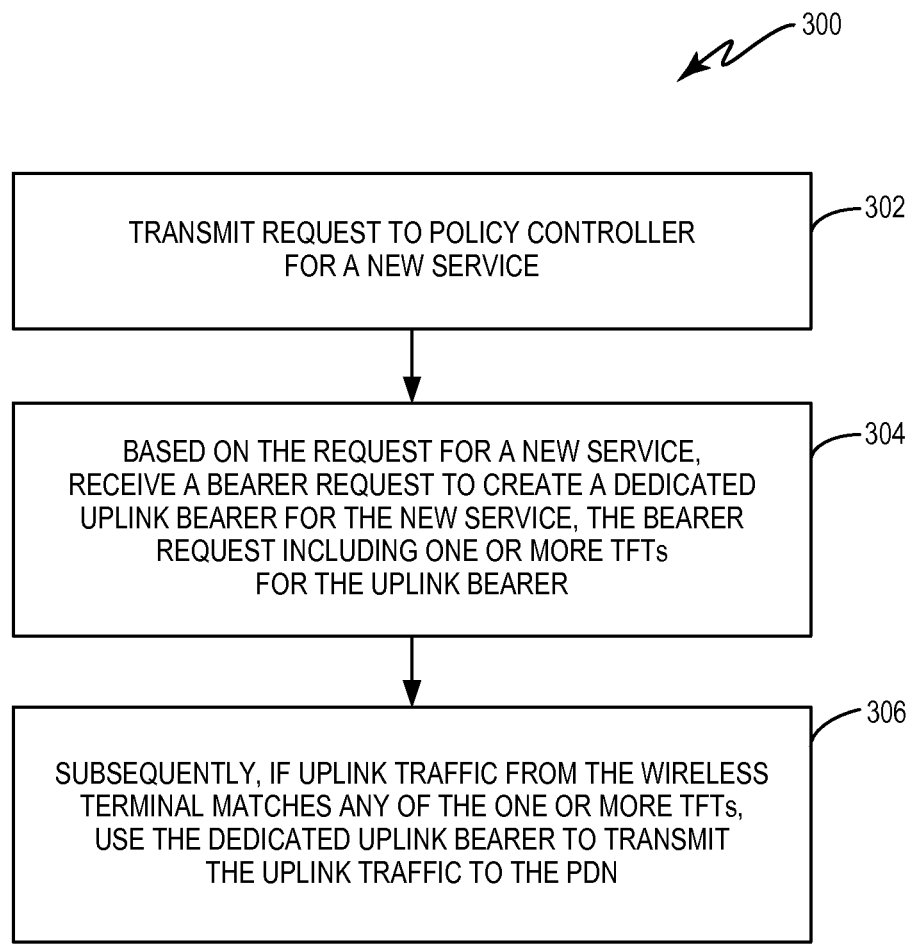
FIG. 5 is a flow diagram of a complementary method performed by a wireless terminal.

FIG. 5 is a flow diagram of a complementary method 300 performed by the wireless terminal 30, which is operative to communicate with the PDN 14 through the WLAN 24 (with the WLAN 24 connecting to the PDN 14 via the broadband access network 34 and the core network 22). The wireless terminal 30 transmits (block 302) a request to a policy controller (e.g., PCRF 50) in the core network for a new service. Based on the request for a new service, the wireless terminal 30 receives (block 304) a bearer request to create a dedicated bearer for the new service, with the bearer request including one or more Traffic Flow Templates (TFTs) for the bearer. Thereafter, if uplink traffic from the wireless terminal 30 matches any of the one or more TFTs, the wireless terminal 30 uses (block 306) the dedicated bearer to transmit the uplink traffic to the PDN 14 through the WLAN 24, the broadband access network 34, and the core network 22. In one or more embodiments, using the dedicated bearer (block 306) comprises marking the uplink traffic that matches one of the TFTs with a QoS indicator received in the create bearer request for the dedicated bearer (e.g., a DSCP indicator).

Figure 6A:
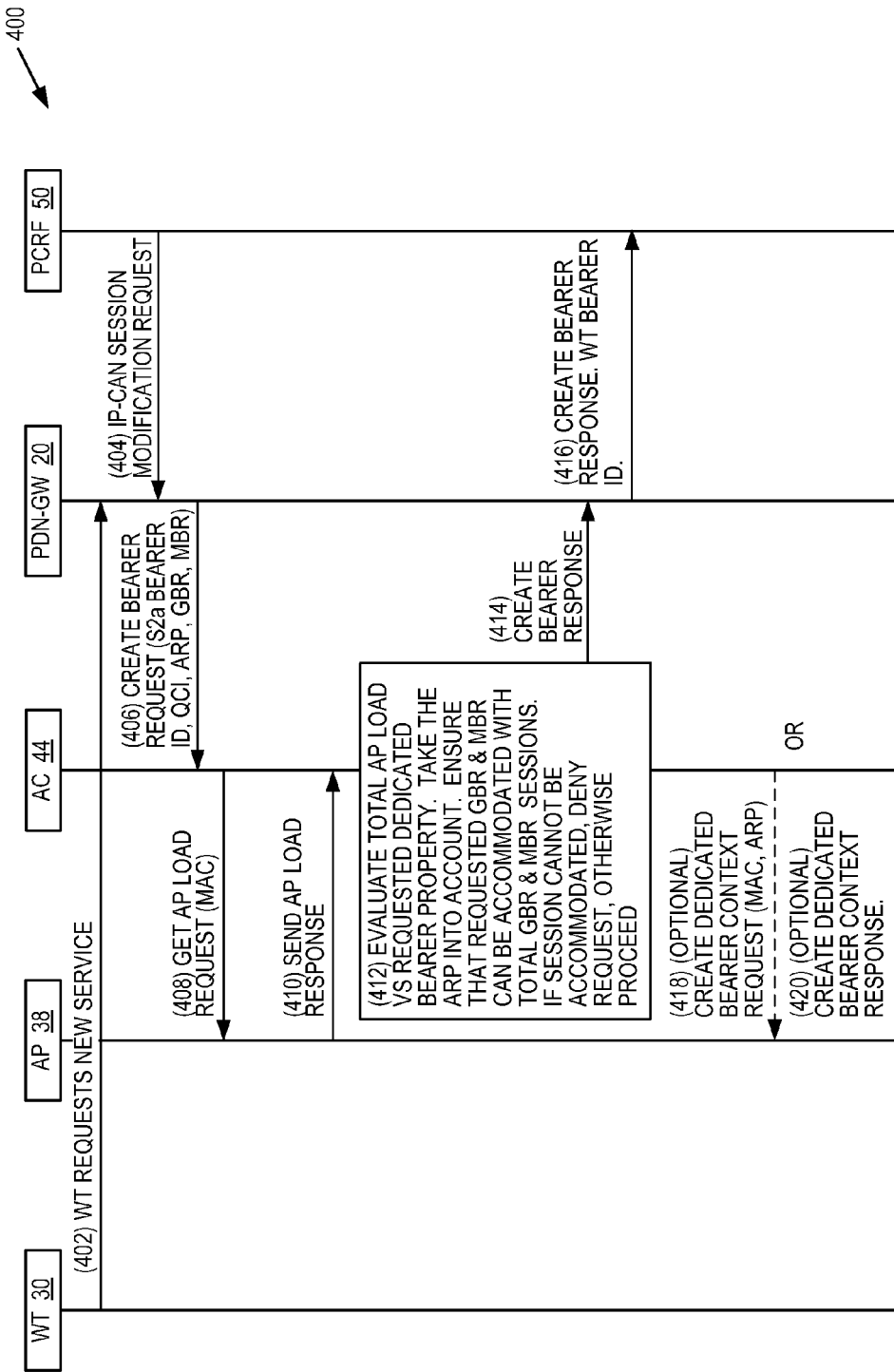
FIGS. 6A-B illustrate a signaling diagram of an example implementation of the methods of FIGS. 3, 4, and 5.
Figure 6B:
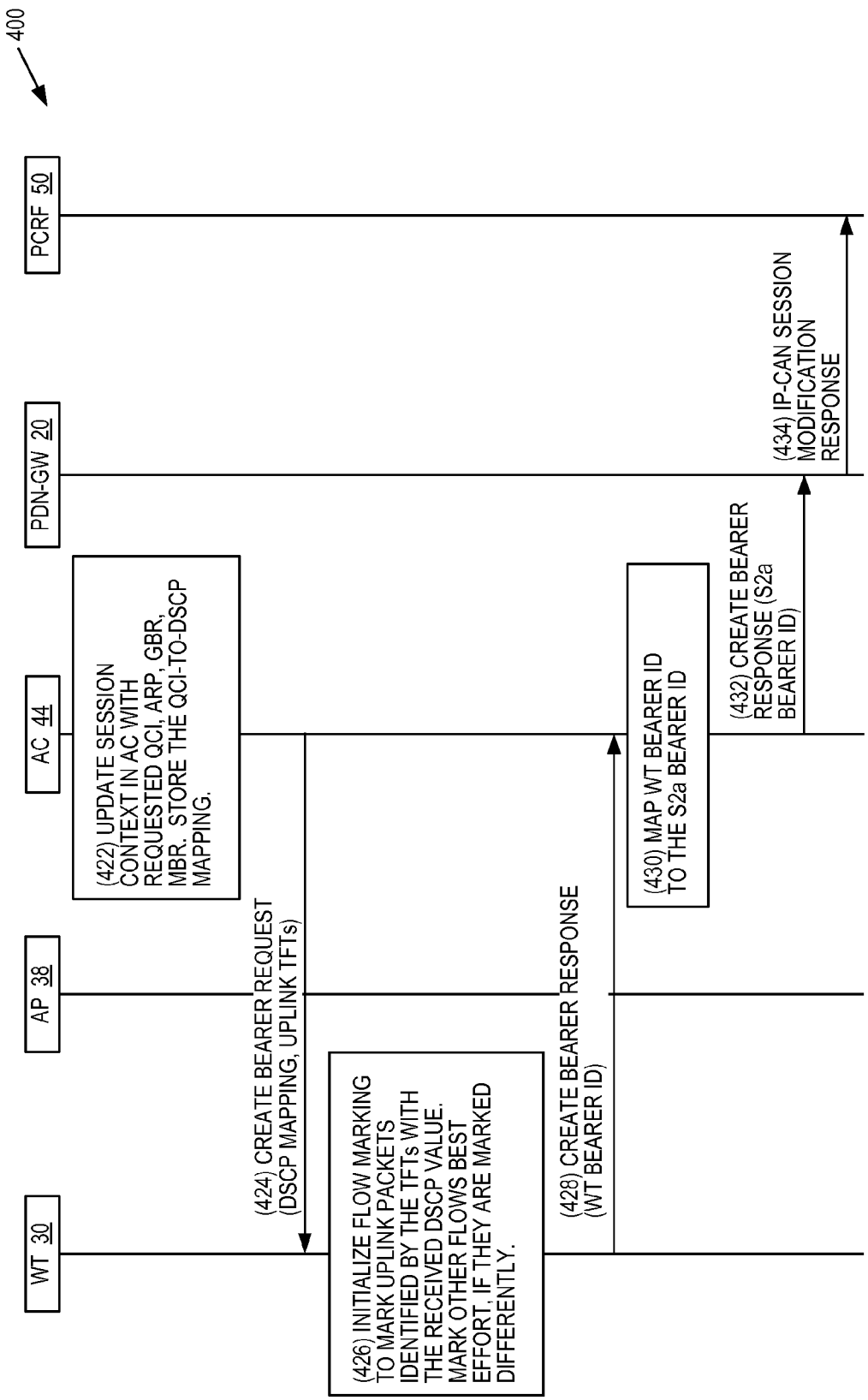

FIGS. 6A-B illustrate a signaling diagram 400 of an example implementation of the methods of FIGS. 3, 4, and 5. The wireless terminal 30 requests (402) a new service (e.g., video streaming), and the PCRF 50 is notified of this request (not shown). Optionally, the wireless terminal 30 may have an on-going Wi-Fi session with the PDN-GW at the time that this request is transmitted. The PCRF 50 transmits an Internet Protocol Connectivity Access Network (IP-CAN) session modification request (404) to the PDN-GW 20 to request a dedicated bearer for the requested service. The PDN-GW 20 then transmits a create bearer request (406) to the AC 44 that includes a S2a interface bearer identifier (ID) and one or more QoS requirements. In one or more embodiments, the QoS requirements include one or more of a QoS Class Identifier (QCI), Allocation and Retention Priority (ARP), Guaranteed Bit Rate (GBR), and Maximum Bit Rate (MBR). Based on the create bearer request, the AC 44 requests (408) load information from the AP 38 to determine if the AP 38 could support the one or more QoS requirements. The request (408) includes a Media Access Control (MAC) address of the wireless terminal 30 to identify which wireless terminal 30 the bearer is being requested for.

The AP 38 responds by providing (410) the requested load information. In one or more embodiments, the load information included in this response includes a QoS basic service set (QBSS) load and received signal strength indicator (RSSI) to the wireless terminal 30 for a preceding time period (e.g., 10 seconds), as well as current GBR and MBR values supported by the AP 38. Other example load information that could be used includes a number of wireless terminals connected to the AP 38, and a total throughput being forwarded through the AP 38. Based on this received load information, the AC 44 determines whether the AP 38 would be able to meet the one or more QoS requirements received at 406. If the AC 44 determines that the AP 38 would not be able to meet those QoS requirements, the AC 44 transmits a create bearer response (414) to the PDN-GW 20 that rejects the create bearer request, and the PDN-GW 20 sends a response (416) to the PCRF 50 that rejects the IP-CAN session modification request.

In one or more embodiments, the responses 414, 416 are reject responses that outright reject the create bearer request of 406 and IP-CAN session modification request of 404. In such embodiments, the PCRF 50 may choose to respond with a modified IP-CAN session modification request that includes lower QoS requirements. In one or more embodiments, the create bearer response 414 and/or IP-CAN session modification response 416 propose modified QoS requirements instead of relying on the PCRF 50 to suggest modified QoS requirements.

Referring again to 412, if the AC determines that the AP 38 would be able to meet the QoS requirements, the AC 44 proceeds to create the requested dedicated bearer. In one or more embodiments this includes sending (418) a create dedicated bearer context requested including a MAC address and ARP value, and receiving (420) a response from the AP 38 to the bearer context request. If 418 and 420 are performed, then the AP 38 is aware of at least one of the QoS parameters of 406 (ARP is shown in FIG. 6A), and could perform radio scheduling based on both DSCP and the at least one QoS parameter. Also if 418 and 40 are performed, then an optional AP bearer ID to be used by the AP 38 in identifying the dedicated bearer may be created (either created by the AP 38, or created by some other network node and provided to the AP 38). However, if 418 and 420 are omitted, the AP could prioritize traffic according to DSCP and without being aware of the specific QoS parameter(s) of 406.

The AC 44 updates a session context with the QoS requirements received at 406 (e.g., QCI, ARP, GBR, and MBR), and stores a QCI-to-DSCP mapping. Examples of such mappings are shown in FIG. 7. Because the core network 22 uses QCI to differentiate QoS classes, and the AP 38 uses DSCP values, a mapping such as those shown in FIG. 7 creates appropriate associations between DSCP and QCI values. Optionally Wi-Fi multimedia support (WMM) mapping values may also be used (e.g., as an internal reference for the AC 44).

The AC 44 then sends (424) a create bearer request to the wireless terminal 30 that includes a DSCP mapping value for the QoS requirements of 406, and one or more uplink traffic flow templates (TFTs). In one or more embodiments, a Layer 2.5 or a Layer 3 protocol is used for the transmission of 424, to convey the uplink DSCP bearer mapping from the AC 44 to the wireless terminal 30. Some example candidate protocols for this can be found in, e.g., 3GPP TS 23.852. In one or more embodiments, the request of 424 also includes a wireless terminal bearer ID to be used by the wireless terminal 30 to identify the dedicated bearer (otherwise the wireless terminal 30 could be relied upon to create its own wireless terminal bearer ID). The AP 38 relays this information from the AC 44 to the wireless terminal 30. In one or more embodiments, a so-called "user plane" is used to transfer this information between the AC 44 and AP 38.

The wireless terminal 30 initializes (426) flow marking to mark uplink packets that match any of the one or more TFTs with the received DSCP value in the mapping, and marks other flows not matching any of the one or more TFTs (i.e., default bearer traffic) as "best effort." The wireless terminal 30 sends (428) a create bearer response that includes a wireless terminal bearer ID (shown as "WT bearer ID" in FIG. 6B), which is different from the S2a bearer ID of 406. The AC 44 maps (430) the wireless terminal 30 bearer ID to the S2a bearer ID, and sends (432) a bearer response to the PDN-GW 20 that includes the S2a bearer ID. In one or more embodiments, the mapping of 430 also maps the AP bearer ID discussed above, which is used by the AC in some embodiments, in a one-to-one correspondence with the S2a bearer ID (e.g., so that the AP would not need to know the S2a bearer ID). The PDN-GW 20 then sends (434) an IP-CAN session modification response indicating successful creation of the requested bearer. The signaling described in the diagram 400 could be repeated to create a plurality of dedicated bearers for a given wireless terminal 30 if desired. In one or more embodiments the dedicated bearer is a dedicated uplink bearer that uses different QoS requirements than a downlink bearer utilized by the wireless terminal 30. In one or more embodiments the dedicated bearer requested by the wireless terminal 30 (and not created based on reflective QoS) is also used for downlink traffic to the wireless terminal 30.

Figure 8:
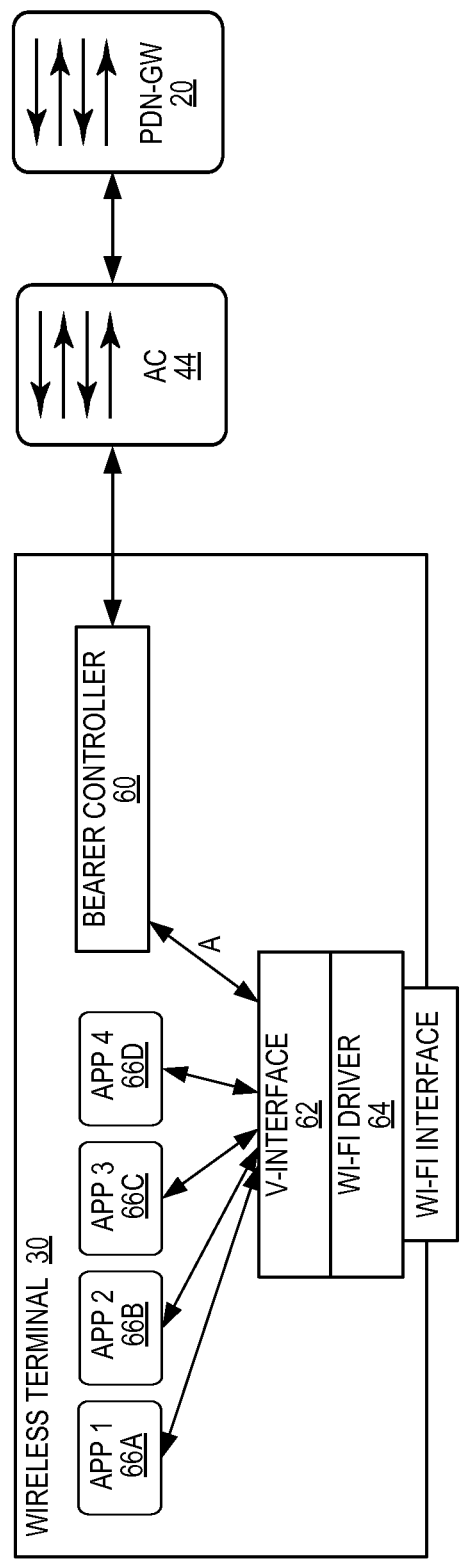
FIG. 8 schematically illustrates a number of functional elements of a wireless terminal operative to implement the method of FIG. 5.

FIG. 8 schematically illustrates a number of functional elements of the wireless terminal 30. The terminal includes a bearer controller 60 operative to receive the dedicated bearer requests from the AC 44, and uses an internal interface "A" to signal the flows of interest. A virtual interface 62 interacts with a Wi-Fi driver 64, receives the tuples associated with a dedicated bearer, and ensures that packets will be marked with the requested DSCP. In particular, the virtual interface 62 ensures that other applications 66A-D running on the wireless terminal 30 will not be adversely impacted by the requested dedicated bearer, and that only the application flows associated with a created dedicated bearer will be tagged with the right DSCP, with other flows not having a dedicated bearer being tagged as best effort traffic (with the Best Effort Code Point).

Figure 9A:
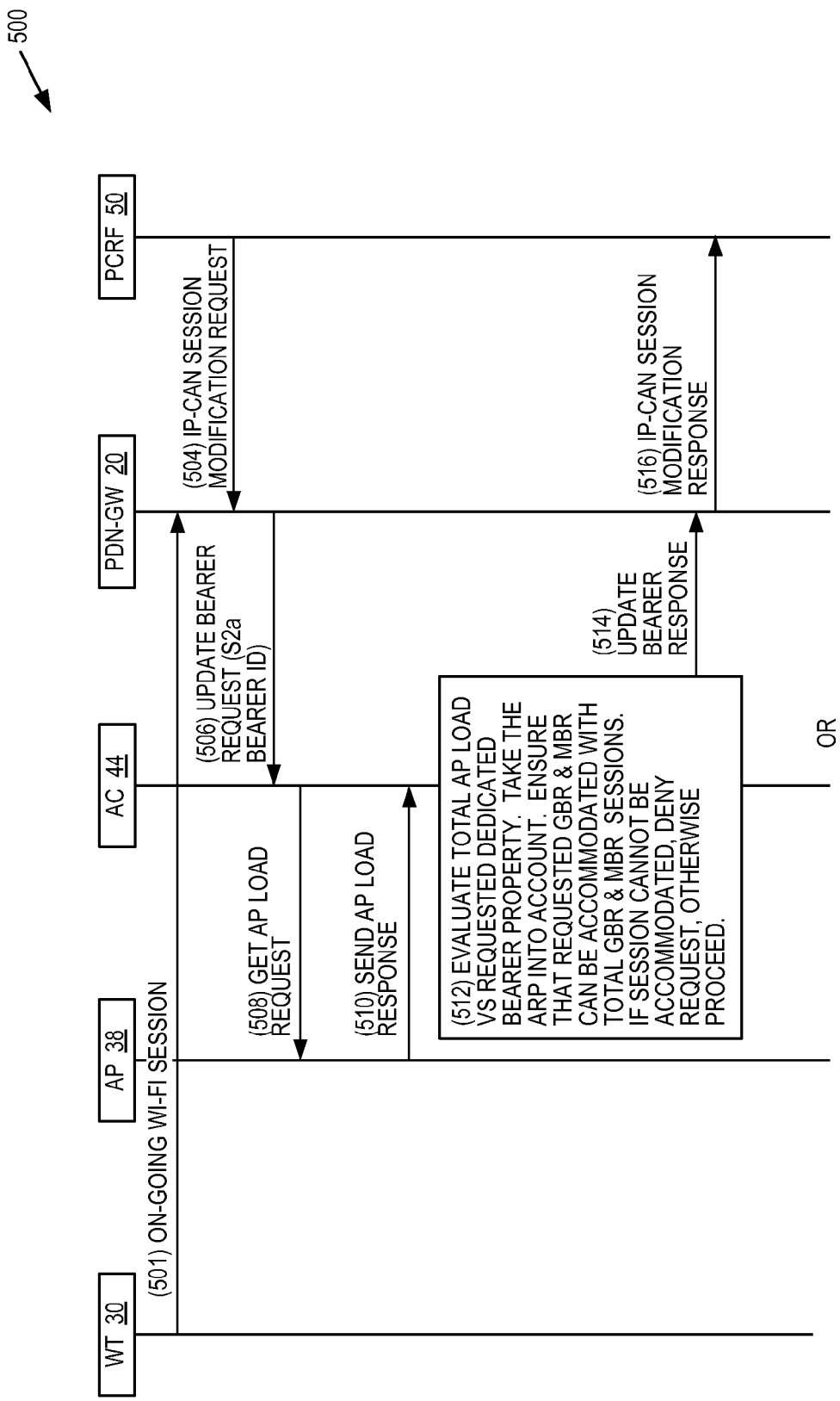
FIGS. 9A-B illustrate a signaling diagram of a procedure for updating a dedicated bearer.
Figure 9B:
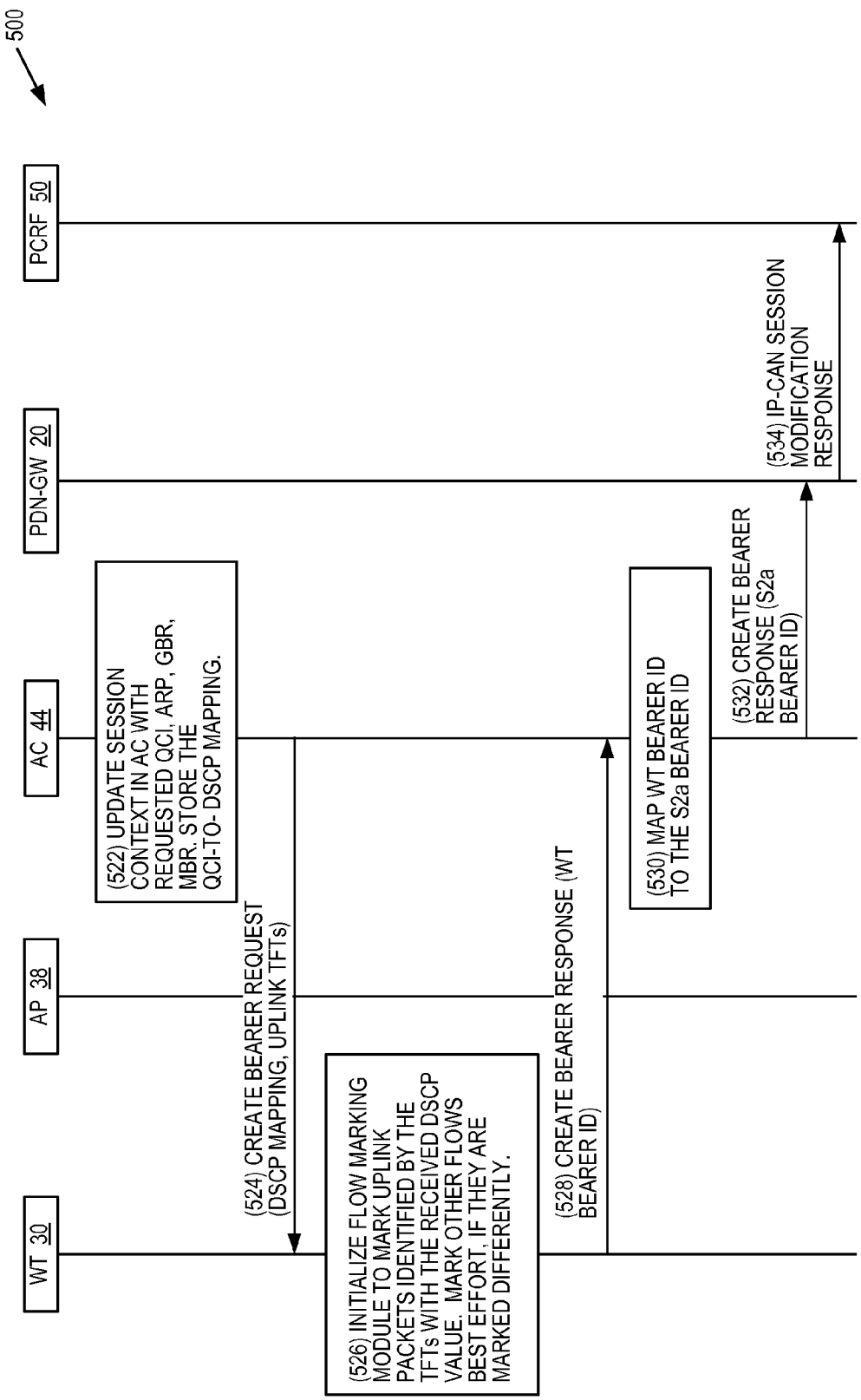

FIGS. 9A-B illustrate a signaling diagram 500 of a dedicated bearer update process. Like reference numerals are used between FIGS. 6A-B and FIGS. 9A-B due to the similarity between the diagrams 400, 500. During an ongoing Wi-Fi session (503), the PCRF submits (504) an IP-CAN session modification request. Signaling 504-534 of FIGS. 9A-B is essentially the same as signaling 404-434 of FIGS. 6A-B, except that the modification of an existing bearer is being requested instead of the creation of a new bearer. This may be desirable if, e.g., the QoS parameters for a given service change. In a similar fashion to FIGS. 6A-B, the bearer update signaling also takes into account whether the AP 38 would be able to support QoS requirements of the modified bearer. In particular, the modification request is only accepted if load information received from AP 38 indicates that the AP 38 would indeed be able to support the QoS requirements of the modified bearer request.

Figure 10:
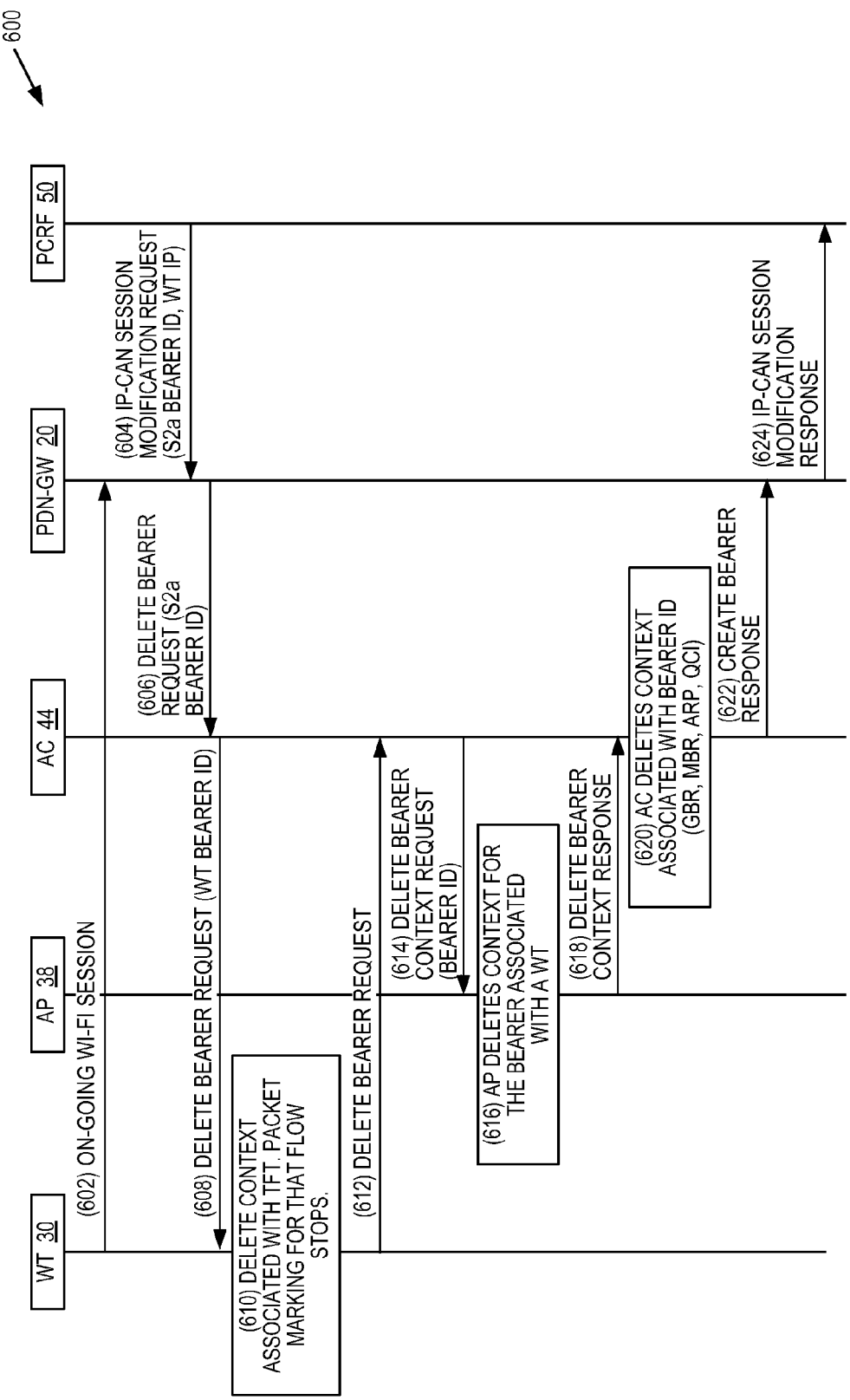
FIG. 10 illustrates a signaling diagram of a procedure for deleting a dedicated bearer FIG. 11 schematically illustrates an example access controller.

FIG. 10 illustrates a signaling diagram 600 of a procedure for deleting a dedicated bearer. The wireless terminal 30 has an on-going Wi-Fi session with the PDN-GW 20 (shown as 602). During this session, the PCRF 50 sends an IP-CAN session modification to request deletion of the dedicated bearer. In the example of FIG. 10, this includes transmitting the S2a bearer ID and the IP address of the wireless terminal 30. The PDN-GW 20 receives the modification request, and transmits (606) a corresponding delete bearer request to the AC 44 that includes the S2a bearer ID. The AC transmits (608) a corresponding delete bearer request to the wireless terminal 30 that includes the wireless terminal bearer ID. The wireless terminal 30 deletes (610) the context associated with the one or more TFTs for the dedicated bearer, and stops the packet marking for the flow associated with the dedicated bearer. The wireless terminal 30 then transmits (612) a delete bearer request to the AC 44, and the AC 44 transmits (614) a delete bearer context request to the AP 38 that includes a bearer ID. In one or more embodiments this is the S2a bearer ID. In one or more embodiments it is some other bearer ID used by the AC that is mapped in a one-to-one correspondence with the S2a bearer ID. The AP 38 deletes (616) the context for the dedicated bearer, and transmits (618) a delete bearer context response. Upon receiving that response, the AC 44 deletes (620) the context associated with the S2a bearer ID (and the one or more QoS requirements of the dedicated bearer). The AC 44 transmits (622) a delete bearer response to the PDN-GW 20, and the PDN-GW 20 transmits (624) a corresponding IP-CAN session modification response to indicate that the dedicated bearer has been deleted.

The reflective QoS used in the prior art suffers from a number of limitations. In particular, the same QCI was used for both uplink and downlink, even if the core network 22 had the capacity to utilize different QCIs. Also, wireless terminals were able to tag uplink frames with a reflective QoS bearer only if a prior downlink frame had been received. This was problematic for Session Initiation Protocol (SIP) traffic, for which wireless terminals often need to initiate traffic, and for other traffic types as well. Moreover, admission control did not taking into account the load of Wi-Fi access points. Still further, once reflective QoS was turned on (e.g., by authentication flags or preconfiguration), reflective QoS was performed on all traffic, and there was no way to apply reflective QoS to only a portion of uplink traffic.

The various techniques described above remove the limitations of the reflective QoS model by enabling a wireless terminal 30 to create an uplink bearer mapping state, based on the uplink QCI information sent by the PCRF 50 to the PDN-GW 20, instead of just using the QCI associated with the downlink traffic. Thus, the wireless terminal 30 is able to use a specific QCI defined for uplink traffic if desired, instead of reusing downlink QCI information through reflective QoS. Also, in one or more embodiments the wireless terminal 30 is able to initiate traffic that is tagged according to the dedicated bearer QCI without having to first receive a downlink frame (e.g., as shown in FIGS. 6A-B). The introduction of admission control leverages knowledge about the AP 38 point load information and current throughput, and potentially other parameters, without adversely impacting current the AP 38 and the wireless terminal 30. This streamlines 3GPP QoS for carrier grade Wi-Fi deployments.

Figure 11:
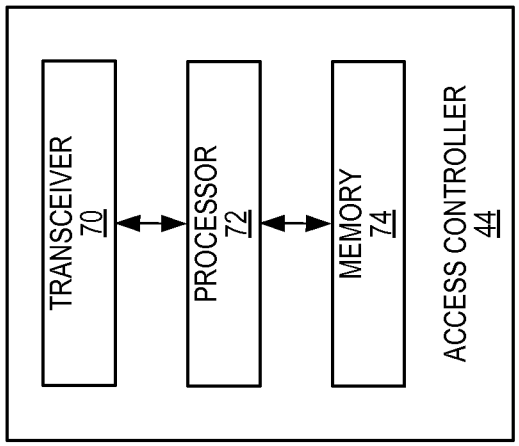

FIG. 11 schematically illustrates an example AC 44 including a transceiver 70, a processor 72, and memory 74. The transceiver 76 sends and receives signals with, e.g., wireless terminal 30, the PDN-GW 20, and AP 38. The processor 72 includes one or more processor circuits, including, for example, one or more microprocessors, microcontrollers, digital signal processors, or the like, and is with appropriate software and/or firmware to carry out one or more of the techniques discussed above. The memory 74 includes one or more types of memory such as read-only memory (ROM), random-access memory, cache memory, flash memory devices, optical storage devices, etc. The AC 44 is configured for use in either broadband access network 34 or WLAN 24, to provide broadband access to PDN 14 from the WLAN 24 via the PDN-GW 20. In particular, the broadband access is provided for wireless terminal 30 in the WLAN 24. The one or more processing circuits of processor 72 are configured to:

receive a bearer request from the PDN-GW 20 that includes one or more QoS requirements, and that requests creation of a dedicated bearer;

responsive to receipt of the bearer request, send a request to AP 38 in the WLAN 24 for load information indicative of a load of the AP 38;

receive the requested load information from the AP 38;

determine, based on the load information, whether the AP 38 would be able to meet the one or more QoS requirements if the bearer request was granted; and if the determining indicates that the access point would be able to meet the one or more requirements, create the dedicated bearer between the wireless terminal 30 and the PDN 30 according to the one or more QoS requirements.

Figure 12:
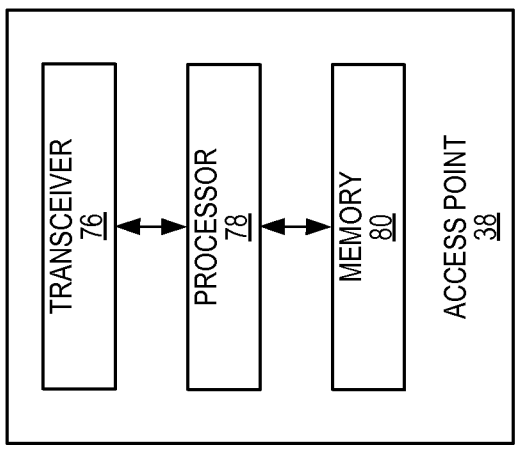
FIG. 12 schematically illustrates an example access point.

FIG. 12 schematically illustrates an example AP 38 that includes a transceiver 76, processor 78, and memory 80. The transceiver 76 sends and receives signals with, e.g., wireless terminal 30 and the AC 44. The processor 78 includes one or more processor circuits, including, for example, one or more microprocessors, microcontrollers, digital signal processors, or the like, and is with appropriate software and/or firmware to carry out one or more of the techniques discussed above. The memory 80 includes one or more types of memory such as read-only memory (ROM), random-access memory, cache memory, flash memory devices, optical storage devices, etc. The AP 38 is configured for use in WLAN 24, to connect wireless terminal 30 in the WLAN 24 to PDN 14 through broadband access network 34. The one or more processing circuits of processor 78 are configured to:

receive a request from a network node (e.g., AC 44) for load information indicative of a load of the AP 38;

transmit the requested load information to the network node;

subsequently receive, based on the transmitted load information, a bearer identifier (ID) and a Differentiated Services Code Point (DSCP) indicator for a dedicated bearer;

receive uplink traffic from wireless terminal 30 that includes the DSCP indicator and the bearer ID; and transmit the received uplink traffic to the PDN 14 using the dedicated bearer.

Figure 13:
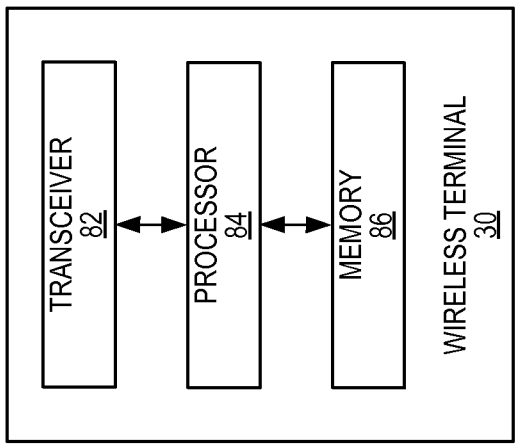
FIG. 13 illustrates an example wireless terminal.

FIG. 13 illustrates an example wireless terminal 30 that includes a transceiver 82, processor 84, and memory 86. The transceiver 72 sends and receives signals with AP 38. The processor 84 includes one or more processor circuits, including, for example, one or more microprocessors, microcontrollers, digital signal processors, or the like, and is with appropriate software and/or firmware to carry out one or more of the techniques discussed above. The memory 86 includes one or more types of memory such as read-only memory (ROM), random-access memory, cache memory, flash memory devices, optical storage devices, etc. The wireless terminal 30 is configured to communicate with a PDN 14 through WLAN 24 that connects to the PDN 14 via broadband access network 34 and core network 22. The one or more processing circuits of the processor 84 are configured to:

transmit a request to a policy controller (e.g., PCRF 50) in the packet core network 22 for a new service;

based on the request for a new service, receive a bearer request to create a dedicated bearer for the new service, the bearer request including one or more TFTs for the bearer; and thereafter, if uplink traffic from the wireless terminal 30 matches any of the one or more TFTs, use the dedicated bearer to transmit the uplink traffic to the PDN 14 through the WLAN 24, the broadband access network 34, and the core network 22.

Although terminology from LTE networks has been used herein, it is understood that the techniques described above are not limited to LTE networks, and that other networks could be used.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method implemented by a wireless terminal that is operative to communicate with a packet data network through a wireless local area network (WLAN) that connects to the packet data network via a broadband access network and a core network, the method comprising:

transmitting a request to a policy controller in the core network for a new service;

based on the request for a new service, receiving a create bearer request from an access controller in the broadband access network to create a dedicated bearer for the new service, the create bearer request including one or more Traffic Flow Templates (TFTs) for the dedicated bearer;

creating, by the wireless terminal responsive to the create bearer request, a dedicated bearer;

sending, by the wireless terminal to the access controller, a create bearer response including a bearer identification (ID) for the dedicated bearer; and thereafter, if uplink traffic from the wireless terminal matches any of the one or more TFTs, using the dedicated bearer to transmit the uplink traffic to the packet data network through the WLAN, the broadband access network, and the core network.

2. The method of claim 1, wherein using the dedicated bearer comprises:

marking the uplink traffic that matches one of the TFTs with a Quality of Service (QoS) indicator received in the create bearer request for the dedicated bearer.

3. The method of claim 1, wherein the dedicated bearer is an uplink bearer having a different Quality of Service (QoS) class identifier (QCI) than a downlink bearer used by the wireless terminal.

4. A wireless terminal configured to communicate with a packet data network through a wireless local area network (WLAN) that connects to the packet data network via a broadband access network and a core network, the wireless terminal comprising one or more processing circuits configured to:

transmit a request to a policy controller in the core network for a new service;

based on the request for a new service, receive a create bearer request from an access controller in the broadband access network to create a dedicated bearer for the new service, the create bearer request including one or more Traffic Flow Templates (TFTs) for the dedicated bearer;

create, responsive to the create bearer request, a dedicated bearer;

a create bearer response including a bearer identification (ID) for the dedicated bearer; and thereafter, if uplink traffic from the wireless terminal matches any of the one or more TFTs, use the dedicated bearer to transmit the uplink traffic to the packet data network through the WLAN, the broadband access network, and the core network.

5. The wireless terminal of claim 4, wherein to use the dedicated bearer, the one or more processing circuits are configured to:

mark the uplink traffic that matches one of the one or more TFTs with a Quality of Service (QoS) indicator received in the create bearer request for the dedicated bearer.

6. The wireless terminal of claim 4, wherein the dedicated bearer is an uplink bearer having a different Quality of Service (QoS) class identifier (QCI) than a downlink bearer used by the wireless terminal.

* * * * *

UNITED STATES PATENT AND TRADEMARK OFFICE
CERTIFICATE OF CORRECTION

PATENT NO.        : 9,578,647 B2
APPLICATION NO.   : 14/013812
DATED             : February 21, 2017
INVENTOR(S)       : Touati et al.

Page 1 of 1

It is certified that error appears in the above-identified patent and that said Letters Patent is hereby corrected as shown below:

On the Title Page

Item (56), Column 2, Line 4, delete "Xi" and insert -- Xi et al. --, therefor.

On Page 2, Item (56), Column 1, Line 1, delete "Tomici" and insert -- Tomici et al. --, therefor.

In the Drawings

Fig. 9a, Sheet 10 of 13, delete Step "(501)" and insert Step -- (503) --, therefor.

In the Specification

Column 4, Line 65, delete "function" and insert -- framework --, therefor.

Column 9, Line 67, delete "transceiver 76" and insert -- transceiver 70 --, therefor.

Column 10, Line 29, delete "PDN 30" and insert -- PDN 14 --, therefor.

Column 10, Line 61, delete "transceiver 72" and insert -- transceiver 82 --, therefor.

Signed and Sealed this
Sixth Day of June, 2017

Michelle K. Lee
*Director of the United States Patent and Trademark Office*